Patented July 11, 1939

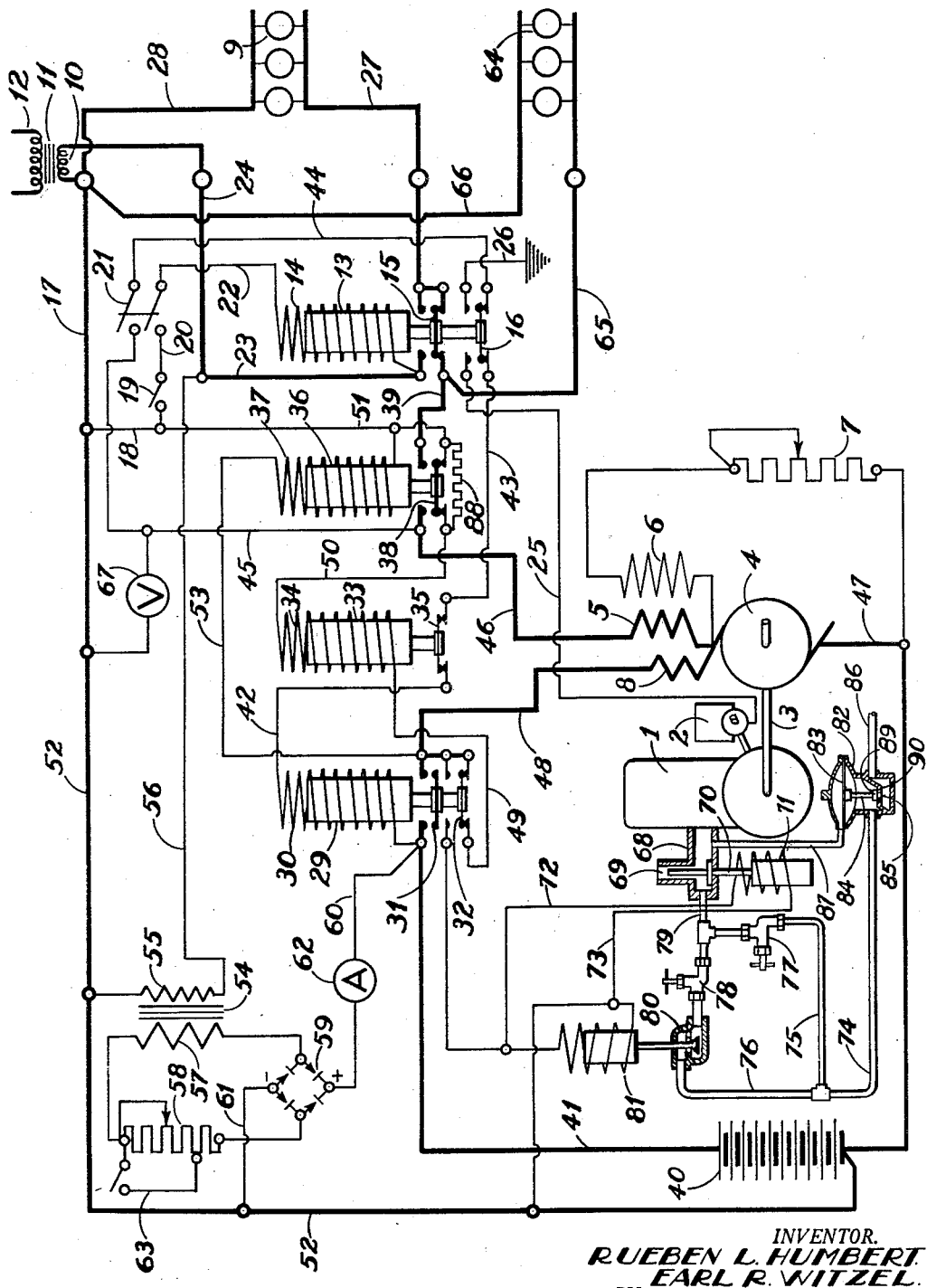

2,165,969

UNITED STATES PATENT OFFICE 2,165,969

PRIME MOVER DYNAMO PLANT

Reuben L. Humbert and Earl R. Witzel, Kohler, Wis.

Application June 17, 1938, Serial No. 214,181

6 Claims. (Cl. 290—30)

Our invention relates to improvements in prime mover dynamo plants, and the objects of our invention are, first, to provide a prime mover dynamo plant which is particularly, though not necessarily exclusively, adapted for use in emergency installations of a type where the plant is installed as auxiliary to a main source of current supply, such as a power line, and automatically becomes operative upon failure of the current supply in said power line; second, to provide a prime mover dynamo plant having electrical cranking means automatically discontinued upon the falling off of current in the cranking circuit due to the counter-electromotive force of the dynamo; and, third, to provide means for limiting the fuel supply during the cranking period.

The drawing is a diagrammatic representation of the invention as applied to an emergency installation, it being understood, however, that certain of the features disclosed are readily adaptable to other than emergency installations.

In the drawing the numeral 1 indicates a prime mover, which may be an internal combustion engine, provided with ignition current supply means such as a magneto 2 and coupled, as by the shaft 3, to a generator 4 which may be of the compound wound type having a series field winding 5 and a shunt field winding 6 in series with the usual adjustable field resistance 7.

The generator 4 is also preferably provided with the series cranking winding 8. If desired, a separate starting motor may be used instead of the series cranking winding 8, these constructions being well recognized by the art as equivalents.

The generator 4 is designed to act as an auxiliary current supply to the line load 9 which is normally supplied from a primary current source such as the secondary 10 of the transformer 11. The transformer 11 may be the reducing transformer of a commercial power supply line having, for example, a voltage of 2300 volts across its primary 12 and supplying a voltage of 110 volts from its secondary 10.

A transfer relay 13 is provided with a magnetic coil 14 and a pair of armatures 15 and 16. When the secondary 10 is energized, current flows from the secondary through leads 17 and 18, single pole test switch 19 (normally closed), lead 20, one pole of double pole disconnecting switch 21, lead 22, coil 14 and leads 23 and 24.

The coil 14 is thus energized, causing the armatures 15 and 16 to be drawn up. In this position the armature 16 closes the circuit between lead 25, which is connected to the magneto 2, and lead 26, which is connected to a ground, thus grounding the magneto 2 and rendering the prime mover 1 inoperative. In this position the armature 15 closes the circuit between leads 23 and 27; thus current is supplied to the line load 9 from the transformer 11 over leads 24, 23, 27 and 28.

In addition to the transfer relay 13, the system comprises three additional relays; a cranking relay 29, provided with a magnetic coil 30 and a pair of armatures 31 and 32; a cranking relay control relay 33, provided with a magnetic coil 34 and an armature 35; and a line closing relay 36, provided with a magnetic coil 37 and an armature 38.

Upon failure of the current supply from the transformer 11 for any reason, the coil 14 becomes de-energized, allowing the armature 15 and 16 to drop to their lower position. In this position the armature 15 closes the circuit between leads 27 and 39. The armature 16 closes a circuit from storage battery 40 through leads 41, coil 30, lead 42, armature 35, lead 43, armature 16, lead 44, one pole of switch 21, leads 45 and 46, series field winding 5, generator 4, and return to battery over lead 47.

The coil 30 is thus energized, drawing armatures 31 and 32 upward and closing the circuit between leads 41 and 48 and making the series cranking winding 8 operative to crank the prime mover by reason of the flow of current from the battery 40 through lead 41, armature 31, lead 48, cranking winding 8, generator 4 and lead 47.

It will be observed that coil 30 is shunted around the series cranking winding 8, hence it receives the maximum energy upon the closing of the armature 16 and continues to be energized as long as there is a substantial flow of current through the series cranking winding 8.

However, when the prime mover begins to function, and the generator 4 builds up a counter-electromotive force in opposition to the battery 40, the current in the cranking circuit 41, 31, 48, 8 falls off and consequently the current through the coil 30 likewise falls off, allowing armatures 31 and 32 to drop and open the cranking circuit.

In this position the armature 32 closes the circuit between leads 48 and 49, thus closing a circuit from series cranking winding 8 through lead 48, armature 32, leads 49, coil 34 of cranking relay control relay 33, lead 50, armature 38, leads 51, 52, and 47. The coil 34 is thus energized, raising the armature 35 of cranking relay control relay 33 and opening the circuit to coil 30. The coil 30 is thus disabled during the operation of the generator, rendering it impossible for the cranking circuit to be closed so long as the generator 4 remains in operation.

When the generator 4 is in operation a circuit is established from series cranking winding 8 through leads 48 and 53, coil 37 of line closing relay 36, leads 51, 52 and 47. The coil 37 is thus energized and, when the current flow reaches a predetermined point, raises the armature 38 and closes the circuit between leads 46 and 39, thus connecting the generator to the load 9 and establishing a return over leads 27, 17, 52 and 47.

The raising of the armature 38 also places the resistance 88 in circuit with the coil 34, thus protecting the coil against overload during the operation of the plant.

When current is again supplied by the commercial line, coil 14 of transfer relay 13 is energized, drawing the armatures 15 and 16 upward, disconnecting the load 9 from the generator and connecting the load to the secondary 10. The upward movement of the armature 16 grounds the magneto 2 and stops the prime mover 1, and also provides a second opening in the circuit through coil 30, maintaining this coil in a de-energized condition even though armature 35 closes as the prime mover stops. The prime mover 1 being stopped and the generator 4 no longer delivering current, the cranking relay control relay 33 and the line closing relay 36 are de-energized and return to their lower or initial position. All relays are then in their original position ready to repeat the cycle.

The battery 40 is charged through a transformer 54 having one end of its primary 55 connected to the lead 52, and the other end of the primary 55 is connected with the lead 56 which connects with the lead 24, thus the primary receives current from the transformer 11.

The secondary 57 of the transformer 54 is in series with a variable resistance 58 and coupled to a rectifier 59 which is in circuit with the battery 40 through leads 60, 41, 52 and 61. An ammeter 62 may be interposed in the circuit to give the operator information as to the rate of charge. The adjustable resistance 58 is adjusted to give the proper rate of trickle charge. In case a higher rate of charge is desired, the switch controlled shunt circuit 63 is closed, shorting the resistance 58 and charging the battery at a higher rate.

It is sometimes desirable to provide an auxiliary circuit energized only by the generator 4. To this end the load 64 is provided, which may be a buzzer, signal light or similar device adapted to give a signal of failure of the main current supply and that the generator 4 is in operation, or may be any other type of load desired. The load 64 is connected in circuit with the generator by means of leads 65 and 66.

The single pole switch 19 opens the circuit to transfer relay 13 and thus allows the plant to be started for test purposes even though there is not a failure of the main current supply.

The double pole switch 21 opens the circuit to transfer relay 13, and also opens the circuit through the cranking relay 29, thus preventing the prime mover 1 from starting. Thus the effect of opening the switch 21 is to disconnect all power from the load 9 but is not interrupt the battery charging circuit.

A voltmeter 67, interposed between leads 45 and 52, indicates the generator voltage.

In the embodiment illustrated, the prime mover 1 is equipped for operation on a gaseous fuel such as illuminating or natural gas. The prime mover 1 is provided with an inlet manifold 68 having an air inlet port 69. A choker 70 is adapted to close the inlet port 69 during cranking to choke the engine. The choker 70 is operated by a solenoid 71 at battery voltage as long as armature 32 is closed in its upper position. Thus battery current follows in conductor 41 through armature 31 and through armature 32, conductor 72, solenoid 71, conductor 73 and wire 52 to battery negative. Thus the choker closes simultaneously with the initiation of the cranking and opens upon cessation of the cranking current.

A connection 86 extends to a gas main or other source of gaseous fuel supply and communicates with the lower part of the regulator 82. The upper portion of the regulator 82 is connected by means of the connection 87 to the intake manifold 68. Thus, when the prime mover is operating the vacuum produced in the intake manifold is effective to draw a diaphragm 83 upwardly. The valve stem 84 is attached to the diaphragm 83 and to the valve 89 which is adapted to seat on the port 85 in the partition 90. Thus when a vacuum is created in the manifold 68 the diaphragm 83 is drawn upwardly opening the valve 89.

The choker 70 is employed to insure the creation of a vacuum sufficient to open the valve 89 while the prime mover is being cranked. However, the operation of the choker, while effective for this purpose, creates too rich a mixture of fuel and air and it is, therefore, necessary to provide means for preventing the fuel mixture from becoming too rich.

To this end the fuel supply pipe 74, leading from the regulator 82, is divided into parallel branches 75 and 76 equipped, respectively, with regulating valves 77 and 78. Thus the proportion of the fuel which passes through each of the branches may be varied at will.

A shut-off valve 80 is interposed in the line 76 and is closed by the solenoid 81, connected in parallel with the choker solenoid 71. Thus the battery current not only operates the choker 70 but also closes the valve 80, closing off the branch 76 and permitting less fuel to be drawn into the manifold 68. By a proper adjustment of the valves 77 and 78 a proper fuel mixture may be obtained both for starting and for running, it being understood that the choker 70 does not close air-tight but permits leakage of air into the manifold.

It will be understood that the disclosure herein is for the purpose of illustration only and that numerous changes may be made in the specific details illustrated without involving the exercise of invention; therefore, the invention is not restricted to said specific details but comprehends all structures within the scope of the appended claims.

We claim:

1. In a prime mover dynamo plant, the combination of a dynamo, a prime mover, cranking means therefor comprising a motor field winding, a battery, a cranking circuit including said battery and said motor field winding, an electromagnetic switch adapted when energized to close said cranking circuit and when de-energized to open said cranking circuit and comprising an electromagnetic coil in shunt relationship to said cranking circuit, and an electrical relay in circuit with said battery and adapted to close the circuit to said electromagnetic switch upon a demand for current from said dynamo, said electromagnetic switch being opened by the de-energization of said electromagnetic coil, said de-energization being directly and solely occasioned by the falling off of current in said cranking circuit upon starting of said prime mover.

2. In a prime mover dynamo plant, the combination of a dynamo, a prime mover, cranking means therefor comprising a motor field winding, a battery, a cranking circuit including said battery and said motor field winding, an electromagnetic switch adapted when energized to close said cranking circuit and when de-energized to open said cranking circuit and comprising an electromagnetic coil in shunt relationship to said cranking circuit, and means operative upon demand for current from said dynamo for closing a circuit from said battery to said electromagnetic coil, the said electromagnetic switch being opened by the de-energization of said electromagnetic coil, said de-energization being directly and solely occasioned by the falling off of current in said cranking circuit upon starting of said prime mover.

3. In a prime mover, the combination of an internal combustion engine having an inlet manifold, a fuel supply line thereto, said fuel supply line being divided into parallel branches in communication with said manifold, both of said parallel branches being open during the normal operation of said prime mover, means for cranking said prime mover, and means for closing one of said branches during the operation of said cranking means.

4. In a prime mover, the combination of an internal combustion engine having an inlet manifold, a fuel supply line thereto, said fuel supply line being divided into parallel branches in communication with said manifold, means comprising an electrical circuit for cranking said prime mover, a normally open shut-off valve in one of said branches, and means for closing said shut-off valve when said cranking circuit is energized.

5. In a prime mover, the combination of an internal combustion engine having an inlet manifold, a fuel supply line thereto, said fuel supply line being divided into parallel branches in communication with manifold, a regulating valve in each of said branches, means comprising an electrical circuit for cranking said prime mover, a normally open shut-off valve in one of said branches, electromagnetic means adapted when energized to close said shut-off valve and an electrical circuit including said electromagnetic means and connected in parallel with said cranking circuit.

6. In a prime mover, the combination of an internal combustion engine having an inlet manifold, a fuel supply line divided into parallel branches in communication therewith, means comprising an electrical circuit for cranking said prime mover, a normally open shut-off valve in one of said branches and electromagnetic means in circuit with said cranking circuit for closing said shut-off valve.

REUBEN L. HUMBERT.
EARL R. WITZEL.